June 14, 1927.
G. L. MILLER
1,632,495
ANTIFRICTION BEARING DRIVE AND HANGER BOX
Filed Dec. 10, 1923     2 Sheets-Sheet 2
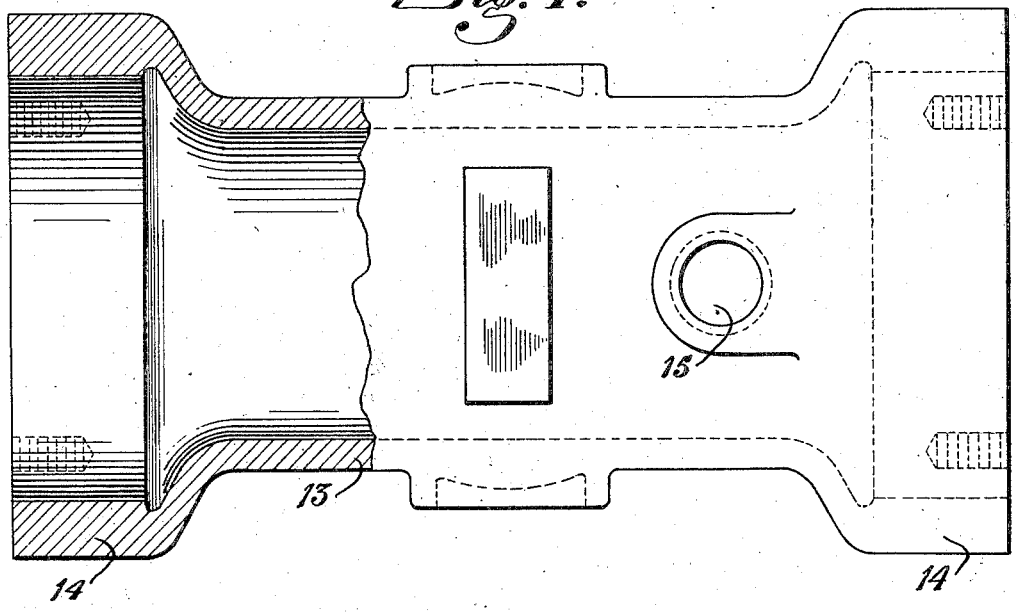
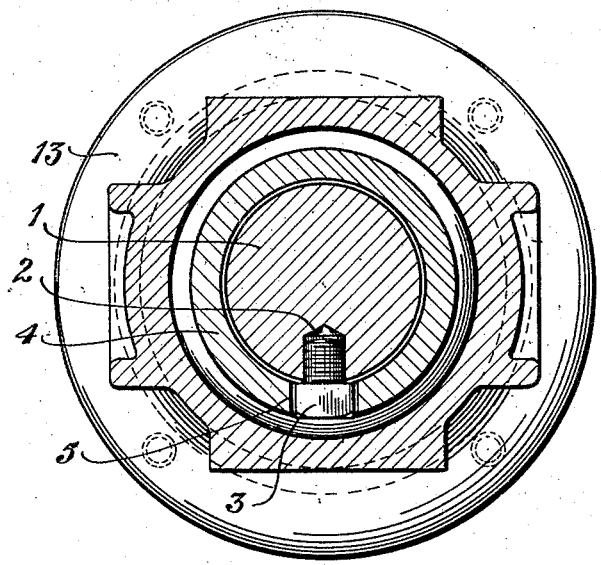
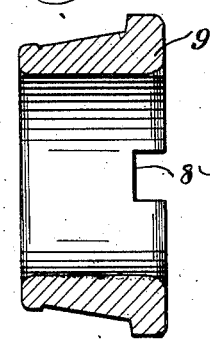
Inventor
G. L. Miller.
By Frease and Bond
Attorneys Patented June 14, 1927.

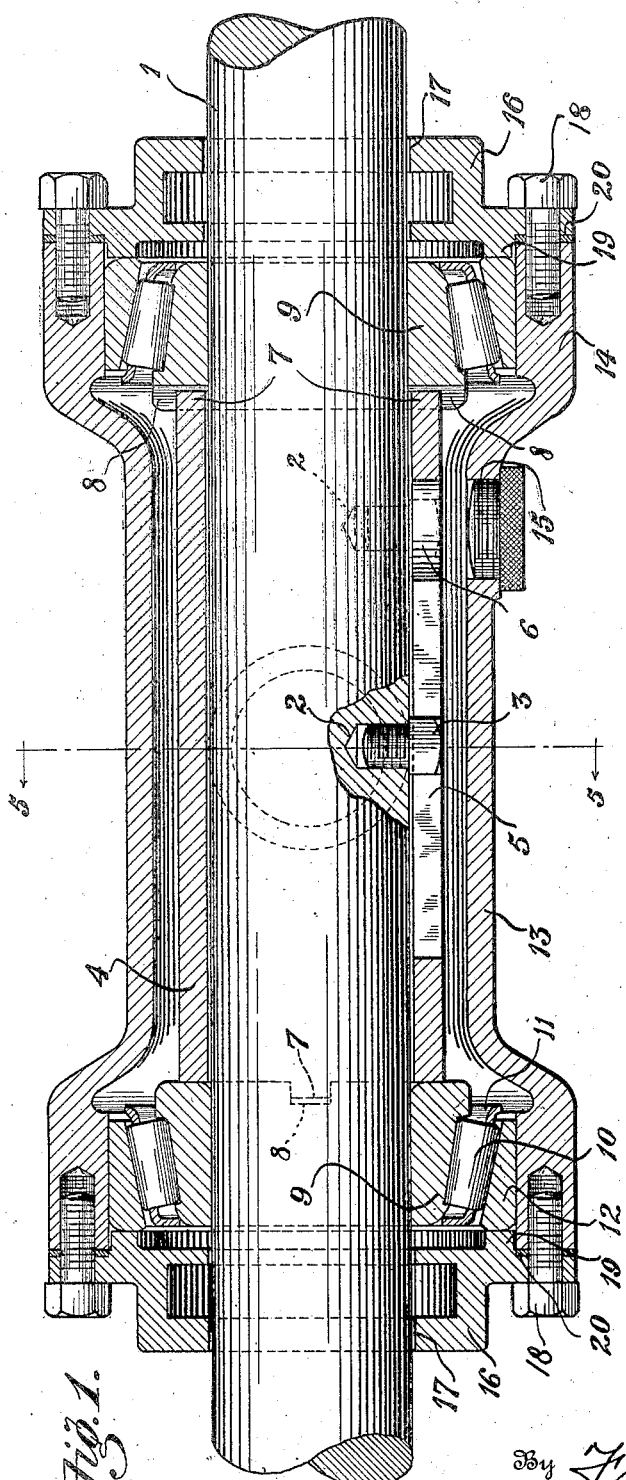

1,632,495

UNITED STATES PATENT OFFICE.

GEORGE LEE MILLER, OF CANTON, OHIO, ASSIGNOR TO THE TIMKEN ROLLER BEARING COMPANY, OF CANTON, OHIO, A CORPORATION OF OHIO.

ANTIFRICTION BEARING DRIVE AND HANGER BOX.

Application filed December 10, 1923. Serial No. 679,595.

This invention relates to hanger boxes provided with antifriction bearing drives for shafting, and the objects of the improvement are to provide a hanger box for shafting provided with a roller or ball bearing drive arranged to be easily and quickly adjusted upon a shaft for assembling in a hanger.

An embodiment of the invention is illustrated in the accompanying drawings, in which—

Figure 1 is a longitudinal sectional view of a hanger box and drive assembled upon a shaft;

Fig. 2, a side elevation of the drive sleeve;

Fig. 3, an end elevation of the same;

Fig. 4, a side elevation partly in section of the hanger box;

Fig. 5, a section on the line 5—5, Fig. 1;

Fig. 6, a longitudinal sectional view through one of the roller bearing cups; and Fig. 7, an end elevation of the same.

Similar numerals of reference indicate corresponding parts throughout the drawings.

A portion of a shaft is shown at 1, provided with a radially disposed, threaded aperture 2, adapted to receive the screw 3, the head of which is preferably square.

The driving sleeve 4 is located around the shaft, the reduced portion 5 of the keyhole slot 6 being arranged to receive the square head of the screw, to prevent rotation of the same, the screw thus acting as a driving lug to rotate the sleeve 4 with the shaft.

The driving sleeve is provided upon its ends with the longitudinally extended lugs 7 which engage the notches 8 in the adjacent ends of the antifriction bearing cones 9, which are mounted upon the shaft at each end of the driving sleeve.

Two of these lugs may be provided upon each end of the bearing sleeve, diametrically opposite to each other, the lugs at each end of the sleeve being preferably located in a plane at right angles to the lugs upon the other end for the purpose of holding the bearing sleeve concentric upon the shaft.

These antifriction bearings may be of the roller bearing type and the rollers 10 of each bearing may be of any usual construction, preferably being tapered as illustrated, and retained in the cage 11, a cup 12 being located around the rollers of each bearing and mounted within the adjacent end of the hanger box 13.

This hanger box is substantially cylindrical, the end portions being preferably enlarged as at 14 to accommodate the roller bearing cups, the internal diameter of the central portion of the hanger box being larger than the driving sleeve 4, in order that the same may rotate freely with the shaft.

An aperture 15 is provided in the hanger box and arranged to register with the enlarged portion 6 of the keyhole slot. End caps 16, provided with central openings 17 to receive the shaft, are mounted upon the ends of the hanger box by means of the screws 18 and are provided with the annular flanges 19 for engagement with the adjacent edges of the bearing cups 12, for holding the same in position. Shim plates 20 may be provided between the ends of the hanger box and the end caps, to permit of any desired adjustment of the bearing cups.

In assembling the hanger box and bearing drive upon the shaft, the driving sleeve, bearings and hanger box are assembled and slid upon the shaft until the aperture 15 of the hanger box and enlarged portion 6 of the keyhole slot in the drive sleeve register with the threaded aperture 2 in the shaft.

The screw 3 is then inserted through the apertures 15 and 6 and screwed into the threaded aperture 2. The entire hanger box and drive may then be moved longitudinally upon the shaft to bring the same into the proper position for attachment to the hanger, which may be of any usual construction.

As the parts are thus moved, the square head of the screw 3 will be received into the reduced portion 5 of the keyhole slot, forming a driving lug upon the shaft for driving the sleeve 4, which in turn drives the bearing cones 9, thus forming an antifriction bearing for the shaft.

It will be understood that the threaded aperture 2 in the shaft is located at approximately the place where the hanger is connected to the hanger box, but it is not necessary to locate this point exactly, as the hanger box and drive sleeve may be slid longitudinally upon the shaft to locate the exact position in which the hanger box is held by attachment to the hanger, the elongated, reduced portion 5 of the keyhole slot in the drive sleeve permitting considerable adjustment of the sleeve and hanger box upon the shaft.

It will also be seen that after the device is assembled and attached to the hanger, longitudinal adjustment of the shaft may be made within the limits of the reduced portion of the keyhole slot, without in any way disturbing the relation of the parts.

With the forms of hanger boxes in general use, it is necessary to use a washer or similar means to prevent end movement of the shaft, and as the continuous rapid rotation of the shaft causes rapid wear upon these washers, frequent repairs are necessary to maintain the shaft in working condition.

In assembling the present hanger boxes upon a shaft, end movement of the shaft may be overcome by arranging the driving sleeves of the two hangers, at the middle of the shaft, in opposite directions and locating the driving lugs at the extreme ends of the slots therein. End movement of the shaft in either direction will thus be prevented.

Expansion and contraction of the shaft, by changes in temperature, may be provided for by so locating the driving sleeves of the remaining hanger boxes, that the accompanying driving lugs upon the shaft, will be at intermediate points in the slots thereof.

I claim:—

1. In combination with a shaft having an aperture for the reception of a driving lug, a driving sleeve upon the shaft having a keyhole slot for the reception of the driving lug, bearing cones connected to the sleeve, a hanger box surrounding the sleeve and bearing cups mounted in the box.

2. In combination with a shaft having an aperture for the reception of a driving lug, a driving sleeve upon the shaft having a keyhole slot for the reception of the driving lug, bearing cones connected to the sleeve, a hanger box surrounding the sleeve and having an aperture for the insertion of the driving lug, and bearing cups mounted in the box.

3. In combination with a shaft having an aperture for the reception of a driving lug, a driving sleeve upon the shaft having a keyhole slot, the enlarged portion of which is adapted to initially register with the aperture in the shaft, bearing cones operatively engaged by the ends of the driving sleeve, a hanger box surrounding the sleeve and having an aperture arranged to register with the enlarged portion of the keyhole slot, and bearing cups mounted in the hanger box.

4. In combination with a shaft having an aperture for the reception of a driving lug, a driving sleeve upon the shaft having a keyhole slot for the reception of the driving lug, bearing cones connected to the sleeve, a hanger box surrounding the sleeve, bearing cups mounted in the box, and end caps upon the hanger box engaging the roller bearing cups.

5. In combination with a shaft having an aperture for the reception of a driving lug, a driving sleeve upon the shaft having a keyhole slot for the reception of the driving lug, bearing cones connected to the sleeve, a hanger box surrounding the sleeve, and having an aperture for the insertion of the driving lug, bearing cups mounted in the box, and end caps upon the hanger box engaging the bearing cups.

6. In combination with a shaft having an aperture for the reception of a driving lug, a driving sleeve upon the shaft having a keyhole slot, the enlarged portion of which is adapted to initially register with the aperture in the shaft, bearing cones operatively engaged by the ends of the driving sleeve, a hanger box surrounding the sleeve and having an aperture arranged to register with the enlarged portion of the keyhole slot, bearing cups mounted in the hanger box, and end caps upon the hanger box engaging the bearing cups.

7. In combination with a shaft having a driving lug, a driving sleeve upon the shaft having a slot engaging the driving lug, bearing cones connected to the sleeve, a hanger box surrounding the sleeve and bearing cups mounted in the hanger box.

8. In a shaft bearing, the combination with a box, and a shaft passing axially through the box, of a clutch sleeve secured upon the shaft within the box, an anti-friction bearing comprising inner race rings loosely fitted upon the shaft and having their inner ends engaged with the respective ends of the sleeve to have relative endwise movement but constrained to rotate therewith, outer race rings having a slip fit in the ends of the box, rolling elements between the race rings, and end plates secured to and covering the ends of the box and limiting the endwise play of the anti-friction bearing.

9. The combination of a journal box, a shaft passing through said box, anti-friction bearings comprising inner and outer race elements and rolling elements therebetween, between the shaft and the box and adjacent the outer ends of the box, a sleeve of slightly larger diameter than the diameter of the shaft between the bearings, fastening means engaging the inner race elements and the sleeve, said fastening means permitting longitudinal movement of the inner race elements relative to the box, and providing positive rotation of the inner race elements with the sleeve, means securing the sleeve to the shaft, and closure plates at the end of the box.

In testimony that I claim the above, I have hereunto subscribed my name.

GEORGE LEE MILLER.